United States Patent [19]

Downey

[11] 4,175,406
[45] Nov. 27, 1979

[54] THRUST CANCELLING SHAFT COUPLING
[75] Inventor: Holmes A. Downey, Bremen, Ind.
[73] Assignee: Reliance Electric Corporation, Mishawaka, Ind.
[21] Appl. No.: 852,152
[22] Filed: Nov. 16, 1977
[51] Int. Cl.² .............................................. F16D 3/78
[52] U.S. Cl. ..................... 64/13; 64/11 R; 64/11 B
[58] Field of Search ................... 64/13, 11 B, 27 NM, 64/11 R

[56] References Cited
U.S. PATENT DOCUMENTS

| | | | |
|---|---|---|---|
| 2,251,804 | 8/1941 | Reuter | 64/11 R |
| 3,024,628 | 3/1962 | Yang | 64/13 |
| 3,054,276 | 9/1962 | Kleinschmidt | 64/27 NM |
| 3,283,534 | 11/1966 | Reich | 64/11 R |
| 3,759,063 | 9/1973 | Bendall | 64/13 |
| 3,813,897 | 6/1974 | Hiersig | 64/13 |
| 3,885,657 | 5/1975 | Sato | 64/13 |

FOREIGN PATENT DOCUMENTS

| | | | |
|---|---|---|---|
| 884715 | 6/1953 | Fed. Rep. of Germany | 64/13 |
| 1016984 | 10/1957 | Fed. Rep. of Germany | 64/13 |

Primary Examiner—Charles J. Myhre
Assistant Examiner—R. C. Turner
Attorney, Agent, or Firm—Marmaduke A. Hobbs

[57] ABSTRACT

A thrust cancelling shaft coupling in which two generally axially disposed flanges are connected by two frustoconically shaped elements positioned in opposite relationship to one another. The large ends of both elements are connected to the flange on one shaft and both small ends are connected to the flange on the other shaft. The thrust forces generated in one element as a result of a tendency to shorten in length under rotational and thrust forces are counteracted by the corresponding forces in the other element so that thrust forces are not transmitted from the element to either the shafts, bearings or other parts of the driving and driven equipment. The larger end of each element is connected to the respective flange, with a sleeve-like member interposed between the larger ends of the elements, and the smaller ends of the elements are connected to a cylindrical member on the opposite flange. The two torsional elements, which are identical in size and shape, are constructed of elastomeric material and are capable of absorbing substantial angular and parallel misalignment between the drive and driven shafts.

11 Claims, 5 Drawing Figures

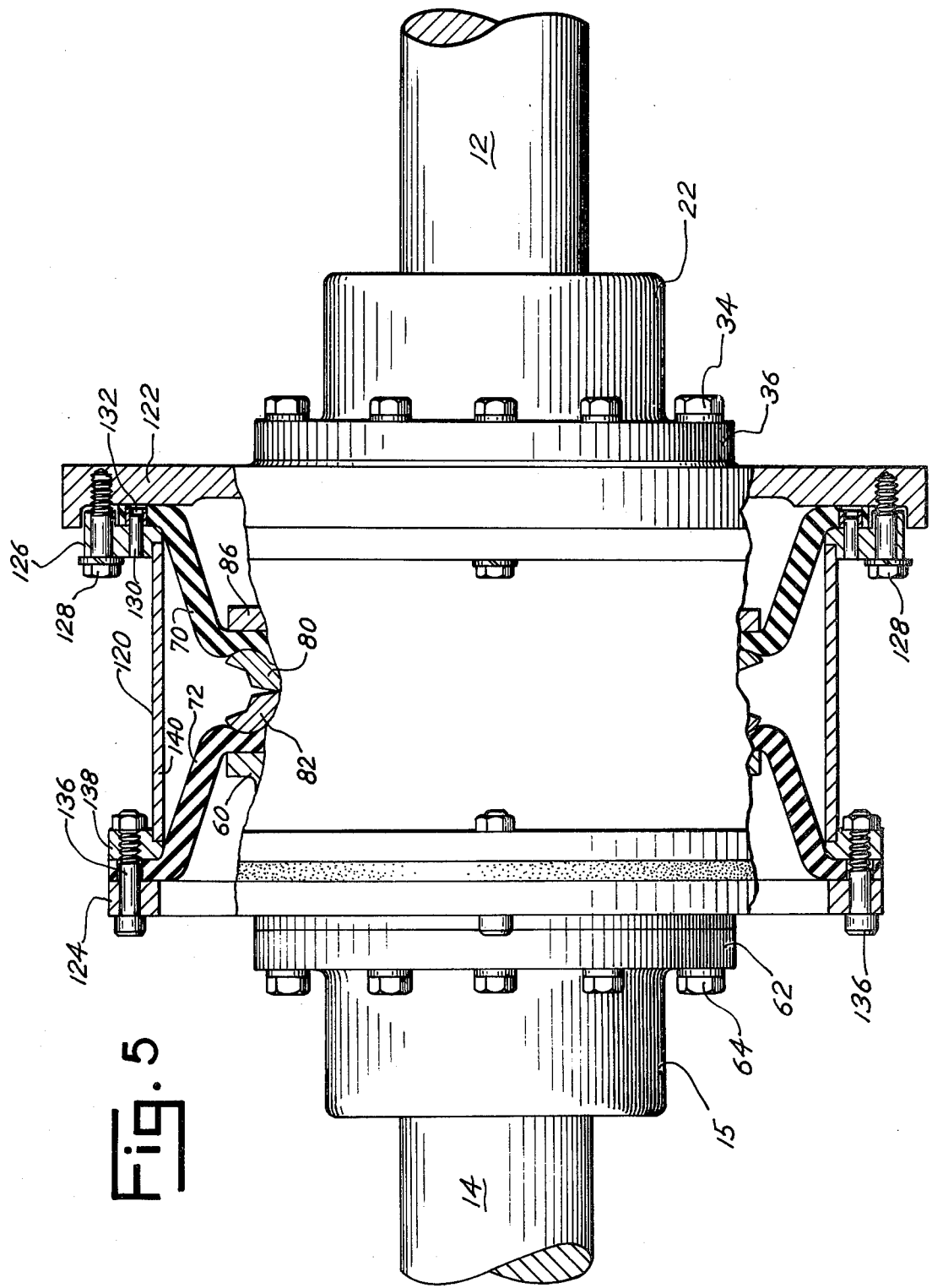

THRUST CANCELLING SHAFT COUPLING

An extensively used and efficient shaft coupling for connecting two shafts in end-to-end relation uses a relatively large flange on one shaft and a relatively small flange on the other shaft, and a flexible torsional element, with large and small annular edges, clamped to the large and small flanges, respectively, and connected together by a frustoconically shaped flexible torsional section interconnecting the two flanges. In this type of coupling, the large flange is sometimes the flywheel of an engine fitted with a power take-off clutch and the flexible element is secured directly thereto, often using a securing ring and screws for clamping the edge of the element to a flange on the flywheel. The flexible element is fully disclosed in the Yang U.S. Pat. No. 3,024,628, and hence will not be described in detail herein. In the operation of a single element of the aforesaid type, the element reacts by attempting to reduce its axial length, compared to the static axial length, in response to a given torque and rotational speed. When the element is restricted from reducing its axial length, thrust forces are generated in the parts of the coupling holding the element, and those forces are transferred to the shafts, bearings and related parts of the driving and driven equipment where substantial damage may result. It is therefore one of the principal objects of the present invention to provide a shaft coupling which utilizes a flexible coupling of frustoconical shape in which the large and small ends are connected to driving and driven flanges for transmitting driving torque between the drive and driven elements, and in which the thrust forces are cancelled in the coupling and prevented from being transferred to the parts of the driving and driven equipment.

Another object of the invention is to provide a flexible coupling for connecting two shafts in end-to-end relation, which contains a multiple flexible element structure wherein the thrust forces tending to reduce the axial lengths of the individual elements are confined to the flexible element structure, and which can be used either with flanges on shafts in end-to-end relation or with an engine flywheel and a driven shaft.

A further object of the invention is to provide a flexible shaft coupling of the aforesaid type, which is simple in construction and operation, and which is sufficiently compact in construction and versatile in operation that it can be used interchangeably in most installations with the coupling of the type disclosed in the aforementioned Yang patent.

Still another object is to provide a shaft coupling having a pair of torsional elements which are so arranged in the coupling that the forces of thrust induced by rotation and torsional distortion of one of the elements are balanced against those functional components of the other of the elements to contain those forces of both elements within the coupling throughout the normal operation thereof.

Additional objects and advantages of the present invention will become apparent from the following description and accompanying drawings, wherein:

FIG. 5 is an elevational and partial cross sectional axial view, the section being the same as the section of FIG. 4, showing a modified form of the present invention.

Figure 1:
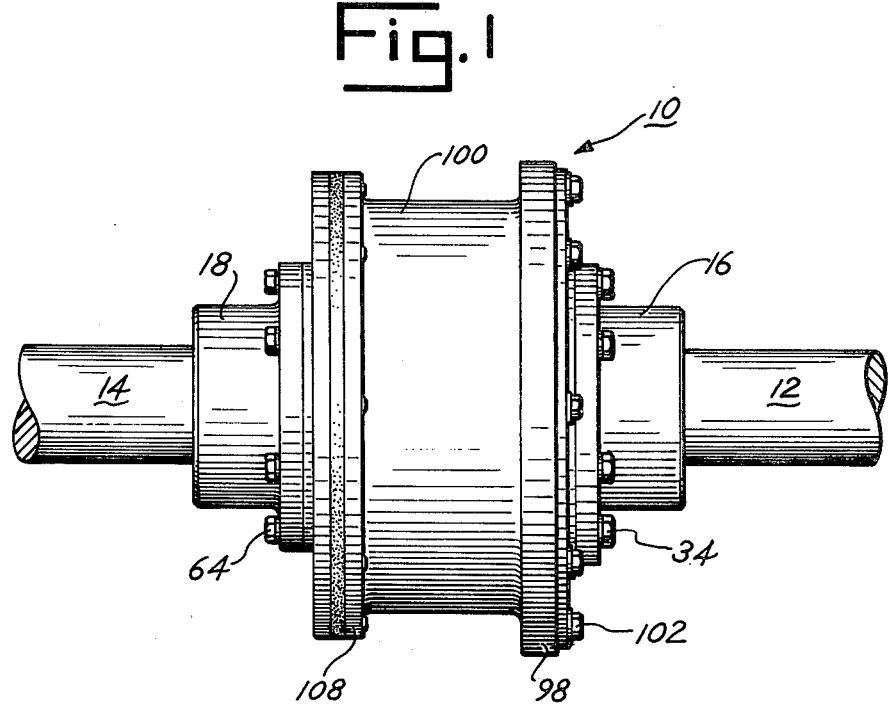
FIG. 1 is a side elevational view of a flexible coupling embodying the present invention.
Figure 2:
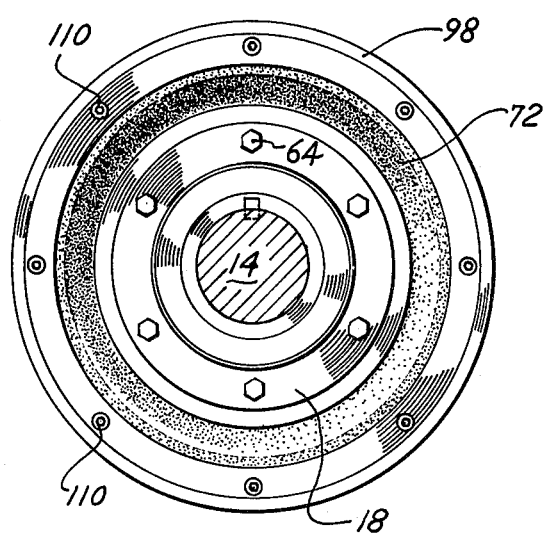
FIG. 2 is an elevational view of the left hand end of the coupling seen in FIG. 1.
Figure 3:
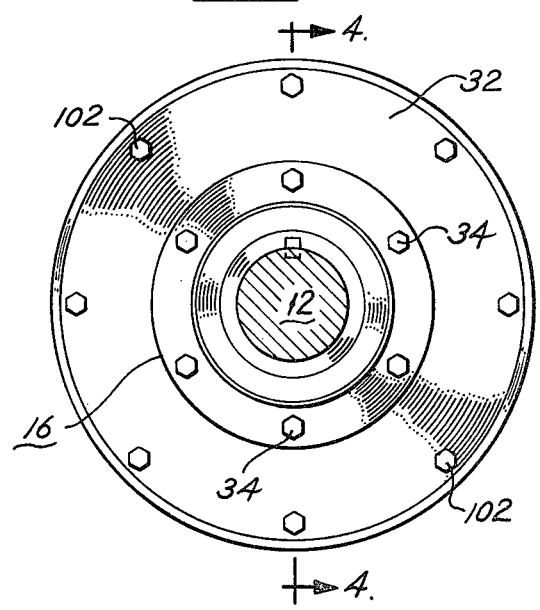
FIG. 3 is an elevational view of the right hand end of the coupling seen in FIG. 1.

Referring more specifically to the drawings, numeral 10 indicates generally a shaft coupling embodying the present invention, mounted on drive shaft 12 and driven shaft 14, the two shafts being arranged in end-to-end relation and spaced from one another at their inner ends. The present coupling may be used in a variety of different applications and installations, including a direct drive from an engine, with the flywheel of the engine forming one of the flanges of the element. In the embodiment illustrated in the drawing, the drive shaft may be an electric motor shaft or a shaft driven by an electric motor (not shown) and the driven shaft is normally the input shaft of the driven equipment.

The coupling consists generally of a flange 16 secured to shaft 12 and a flange 18 secured to shaft 14 and a flexible coupling assembly indicated generally by numeral 20. The flange 16 includes a hub 22 secured to the shaft by a tapered bushing 24, which is further secured to the shaft by a key 26 in slots 28 and 30 in the shaft and bushing, respectively. The flange has a radially extending ring 32 secured to hub 22 by a plurality of screws 34 extending through a flange 36 into threaded openings 38 in the inner edge of ring 32. Flange 18 includes a hub 50 secured to output shaft 14 by a tapered bushing 52 and a key 54 seated in grooves 56 and 58 in the shaft and bushing, respectively. An axially extending cylindrical or annular member 60 is secured to flange 62 of hub 50 by a plurality of screws 64 extending through holes in flange 62 into threaded holes 66 in the end of annular member 60 to secure the annular member rigidly to hub 18.

The two flanges 16 and 18 are connected to one another by a pair of generally frustoconically shaped elements 70 and 72. The two elements are essentially identical in construction and operation, and the inner edges 74 and 76 of the two elements are secured to annular member 60 by a structure consisting of annular groove 78 into which the inner edges of elements 70 and 72 seat. The two inner edges are held firmly in grooves 78 by a pair of rings 80 and 82 seated on shoulder 84 and secured in place by ring 86 which is attached to annular member 60 by a pluraltiy of screws 88 extending through holes in rings 80, 82 and 86 and threadedly received in holes 90 in member 60. Rings 80 and 82 have laterally extending annular beads 92 and 94, respectively, which press firmly against the inner edge of the edges 74 and 76 when screws 88 are tightened to clamp the two elements securely between ring 86 and shoulder 96 of member 60.

The outer edge of element 70 is secured to ring 32 near the periphery thereof by flange 98 on a sleeve 100 and screws 102 extending through holes in ring 32 and element 70 and threadedly received in holes 104 of flange 98. When screws 102 are tightened, the flange 98 clamps the outer margin of element 70 firmly in place on ring 32. The outer margin or edge of element 72 is secured to the opposite end of sleeve 100 by a ring 106 which is secured to flange 108 of sleeve 100 by a plurality of screws 110 extending through holes in ring 106 and in the margin of element 72 into a threaded hole 112 in flange 108. Sleeve 100 is of rigid metal construction and firmly holds the outer margin of element 72 in a fixed position and transfers torque forces from shaft 12 to element 72, which in turn transmits the forces to member 60. The forces are also transferred from ring 32 through element 70 to member 60. In the coupling, the two elements 70 and 72 are essentially identical in construction and operation, and since they are assembled in opposite directions in the coupling, stress forces generated in the two couplings are essentially the same, and, because of the opposite relationship in the assembly, the thrust forces of one element are cancelled by the forces of the other element.

In the operation of the foregoing shaft coupling, with the coupling mounted on the shafts 12 and 14 in the manner illustrated in the drawings, the torque from drive shaft 12 is transmitted through flange 16, including ring 32, to the element 70, and through sleeve 100 to element 72. Since the two elements are firmly clamped to member 60 by rings 80, 82 and 86 by screws 88, the torque is transmitted to and through annular member 60 to flange 18, and thence to driven shaft 14. The two outer margins of elements 70 and 72 are operationally connected to flange 16 by sleeve 100 and are mounted in the coupling in opposing position, with the inner margins of the elements both connected to member 60, which in turn is connected to flange 18. Thus, when each element reacts by attempting to reduce its axial length compared to its static axial length during the operation of the coupling, the torsional distortion of one element is balanced by the distortion of the other element. The thrust forces generated in the elements of the coupling are not transferred to the shafts, bearings and related parts of the driving and driven equipment where damage or excessive wear would otherwise likely result. The two elements 70 and 72 operate essentially the same as single elements, but are so positioned in the coupling that the thrust forces react against one another, thereby cancelling their effect in the forces transmitted to and from the coupling during operation. The foregoing advantages are obtained without substantially increasing the space required for installation of the coupling, and the life of the parts of the coupling is increased while obtaining optimum performance under various operating conditions such as angular and parallel misalignment of the shafts. Further, the elements can be replaced after installation without disturbing the setting on the two flanges, by merely removing sleeve 100 and rings 80, 82 and 86 and the screws 88, 102 and 110 for retaining these parts together. While, in the description, the larger ends of the torsional elements are connected to the driving flange and the smaller ends to the driven flange, the coupling can be operated with flange 18 being the driving flange and flange 16 being the driven flange. Since the two flanges may be mounted on shafts, or one may be a flywheel, the shafts and flywheel or similar machine part may be referred to in the claims as rotatable elements.

Figure 4:
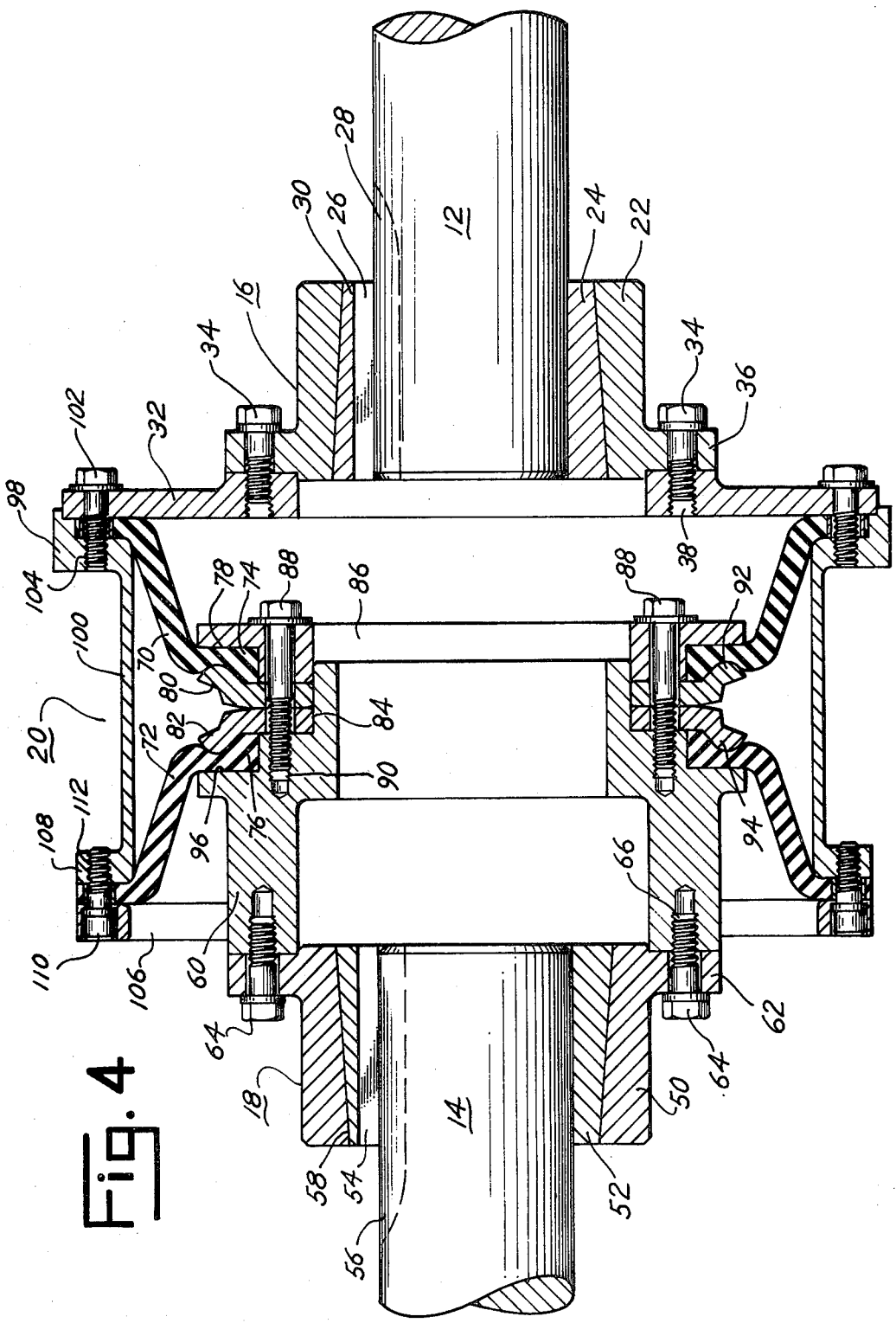
FIG. 4 is an axial cross sectional view of the shaft coupling shown in the preceding figures, the section being taken on line 4—4 of FIG. 3.

A modified form of the present invention is illustrated in FIG. 5, which is in most respects the same as the embodiment previously described herein. In view of the similarity between the previously described embodiment and the modified embodiment of FIG. 5, like numerals will be used to refer to like parts. The primary differences between the coupling of FIGS. 1 through 4 and the one of FIG. 5 are in the sleeve 120 and the attachment of the sleeve to flange 122 and ring 124 in the latter embodiment. In the embodiment of FIG. 5, flange 126 of the sleeve is secured to flange 122 by screws 128 extending through flange 126 into threaded holes in flange 122. The screws do not extend through the margin of element 70, but rather flange 126 seats directly on flange 122 and pins 130 in flange 126 extend into holes 132 in the margin of element 70. The sleeve is connected to element 72 by ring 124 and a plurality of screws 136 extending through the ring and flange 138 of sleeve 120. The two flanges 126 and 138 are secured rigidly to cylindrical body portion 140 by welding or other suitable securing means so that the flanges and the body portion form an integral sleeve structure. When the coupling has been assembled in the manner illustrated in FIG. 5, with the two elements 70 and 72 clamped firmly to flange 122 and sleeve 120 at their outer edges, and to member 60 at the inner edges as illustrated in FIG. 4, the coupling operates in the same manner as the embodiment of the coupling illustrated in FIGS. 1 through 4, and the advantages of the coupling previously described are obtained by the structure of the embodiment of FIG. 5.

While one embodiment and one modification of the flexible shaft coupling embodying the present invention have been described in detail herein, various changes and modifications may be made without departing from the scope of the invention.

I claim:

1. A thrust cancelling shaft coupling comprising a first rotatable element with a flange thereon, a second rotatable element with a flange thereon and in substantially axial alignment with said first element, an axially extending member on said second element projecting toward said first element but spaced therefrom and being smaller in diameter than the periphery of the flange on the first element, a first generally frustoconical flexible torsional element connected at its larger end to the flange on the first rotatable element and at its smaller end to said axially extending member, an axially extending annular means spaced radially outwardly from and overlapping said axially extending member and being of a diameter substantially the same as the diameter of the larger end of said torsional element, means connecting one end of said annular means to the flange of said first rotatable element, and a second generally frustoconical flexible torsional element connected at its larger end to the other end of said annular means and at its smaller end to said axially extending member in relatively close proximity to the smaller end of said first flexible torsional element.

2. A thrust cancelling shaft coupling as defined in claim 1 in which said axially extending annular means is a cylindrical sleeve.

3. A thrust cancelling shaft coupling as defined in claim 2 in which an annular member engages the larger end of said second torsional element and a plurality of screw means clamp said annular member and torsional element to the corresponding end of said annular means.

4. A thrust cancelling shaft coupling as defined in claim 1 in which said axially extending member is generally cylindrical in shape and a plurality of rings clamp said smaller ends to said axially extending member.

5. A thrust cancelling shaft coupling as defined in claim 3 in which said axially extending member is generally cylindrical in shape and a plurality of rings clamp said smaller ends to said axially extending member.

6. A thrust cancelling shaft coupling as defined in claim 1 in which said axially extending annular means surrounds said axially extending member and is cylindrical in shape with annular ends for engaging the larger ends of said torsional elements, and in which said axially extending annular means is rigidly secured to said flange on the first rotating element for rotation therewith.

7. A thrust cancelling shaft coupling as defined in claim 5 in which said axially extending annular means surrounds said axially extending member and is a cylindrical sleeve with annular ends for engaging the larger ends of said torsional elements, and in which said sleeve is rigidly secured to said flange on said first rotating element for rotation therewith.

8. A thrust cancelling shaft coupling as defined in claim 1 in which said torsional elements are of elastomeric construction and are of substantially the same size and shape.

9. A thrust cancelling shaft coupling as defined in claim 7 in which said torsional elements are of elastomeric construction and are of substantially the same size and shape.

10. A thrust cancelling shaft coupling as defined in claim 1 in which said torsional elements are spaced from one another and a ring means is disposed between the smaller ends of said torsional elements, and means secures the two torsional elements and said ring means firmly to said axially extending member.

11. A thrust cancelling shaft coupling as defined in claim 9 in which said torsional elements are spaced from one another and a ring means is disposed between the smaller ends of said torsional elements, and means secures the two torsional elements and said ring means firmly to said axially extending member.

* * * * *